United States Patent [19]

Daniel et al.

[11] 4,307,197

[45] Dec. 22, 1981

[54] REFRACTORY INSULATING VENEER

[75] Inventors: John G. Daniel, Cicero; David S. Kerr, Wheaton; Frederick V. Reven, Homewood, all of Ill.

[73] Assignee: Nalco Chemical Company, Oak Brook, Ill.

[21] Appl. No.: 149,830

[22] Filed: May 15, 1980

[51] Int. Cl.$^3$ .............................................. C04B 35/52
[52] U.S. Cl. .................................... 501/100; 501/101
[58] Field of Search ................. 106/56, 62, 69, 38.27, 106/38.28

[56] References Cited

U.S. PATENT DOCUMENTS

| | | | |
|---|---|---|---|
| 2,786,771 | 3/1957 | Waterhouse et al. | 106/38.28 |
| 2,942,991 | 6/1960 | Smith | 106/69 |
| 2,995,453 | 8/1961 | Noble et al. | 106/38.27 |
| 3,231,401 | 1/1966 | Price et al. | 106/69 |
| 4,014,531 | 3/1977 | Takashima | 106/68 |
| 4,226,625 | 10/1980 | Delcorio et al. | 106/38.28 |

*Primary Examiner*—James Poer
*Attorney, Agent, or Firm*—John G. Premo; Robert A. Miller; Barry W. Sufrin

[57] ABSTRACT

A tundish veneer composition comprising about 45–80 percent by weight of MgO, about 1–7 percent by weight of a refractory clay filler, about 1–15 percent by weight of a refractory glass wool fiber, about 3–10 percent of aqueous colloidal silica binder, and optionally, up to about 15 percent by weight of graphite, a foaming agent, or a dispersing agent.

9 Claims, No Drawings

REFRACTORY INSULATING VENEER

BACKGROUND OF THE INVENTION

The present invention is directed generally to a wear-resistant refractory composition and more particularly concerns a working refractory lining for insulating and protecting tundish interiors.

In a typical steel casting operation, molten steel is poured from huge ladles into smaller insulated holding vessels known as tundishes. The structure and use of tundishes in casting of steel is well-known to those working in steel industries throughout the world. A useful discussion of tundish design and usage appears in THE MAKING, SHAPING AND TREATING OF STEEL, 9th Edition, 1971, U.S. Steel, Page 710, etc.

Tundishes are designed for containing molten steel in its molten state over a period of time of up to an hour or more during which the steel is fed from the tundishes at a controlled rate to waiting molds. The tundishes are insulated and protected by a safety lining in the form of a matrix of refractory bricks resting on the tundish inner surface which are usually covered in turn by a working lining consisting of a two inch layer of sand and a layer of tundish "top boards". These days, however, refractory veneers are increasingly being used to replace the sand and top board layers.

Tundish top boards are pre-formed shapes made up of a refractory and fiber composition which are placed on a sand intermediate layer over the safety lining of cold tundishes, and keyed or otherwise anchored in place. Top boards cannot be replaced while the tundish is hot and localized wear of the tundish layer requires complete removal and replacement of the working lining. Indeed, tundish top boards are generally good for only a single continuous loading of molten steel due to rapid deterioration of boards and board interstices.

In contrast to traditional top board working linings, refractory veneers may be gunned in place of otherwise applied while the tundish is still hot. An intermediate layer of sand is not required. Furthermore, as localized wear of the veneer occurs, worn portions may be restored without removing the prior coating. Thus, tundish veneer coatings are much more convenient to use than the prior tundish top boards.

However, in order to provide a truly useful and effective alternative to tundish top boards, it is necessary that the tundish veneers be capable of efficiently insulating the tundish interior and withstanding both chemical and physical attack as well as or better than tundish boards. Furthermore, in order to provide a truly practical alternative to tundish top boards, tundish veneers must be made of commonly available and economical materials.

Tundish veneers must have sufficient strength or wear resistance to withstand physical attack by molten steel. The veneers must also exhibit a relatively low thermal conductivity in order to maintain the molten steel within the tundish in its molten state. Although the desired refractory material strength may generally be obtained by developing increasingly dense refractory compositions, unfortunately increasing material density is associated with decreasing thermal insulating properties. Therefore, a successful tundish veneer must exhibit the unusual combination of good strength accompanied by good thermal insulating characteristics.

The tundish working lining, whether it be top boards or refractory veneer, must not only exhibit good thermal insulating properties as well as the ability to withstand physical attack, it also must be capable of resisting chemical attack by the molten steel and accompanying slag. The principal source of chemical attack to the working lining arises from an acid/base reaction between the chemically aggressive slag component of the molten steel and the working lining. Thus, "basic slag" steels cause rapid deterioration of acid-type refractories such as silica and silicate-based refractories and "acid slag" steels cause rapid deterioration of basic-type refractory coatings such as magnesia and calcia based coatings. Since the present compositions are magnesia based, they will not react with basic slag steels and are therefore particularly well suited for use with such steels. An example of an acid resistant refractory veneer appears in U.S. Pat. Application No. 45,531, filed June 4, 1979 and assigned to the assignee of the present application, Nalco Chemical Company.

SUMMARY OF THE INVENTION

It is therefore an object of the present invention to provide a refractory veneer composition particularly useful for lining tundishes.

Another object of the present invention is to provide a tundish veneer with sufficient thermal insulating properties to maintain molten steel within the tundish in its molten state for extended periods of time.

Yet another object of the present invention is to provide a refractory tundish veneer capable of withstanding chemical and physical attack from molten steel and slag teemed into and contained within the tundish.

A further object of the present invention is to provide a refractory composition which can be easily applied to tundish surfaces, whether hot or cold.

Other objects and features of the invention will become apparent upon examination of the following specification together with the claims. While the invention is described herein in connection with preferred or illustrative embodiments, these embodiments are not intended to be exhaustive or limiting of the invention. Rather the invention is intended to cover any alternatives, modifications and equivalents that may be included within its sphere and scope as defined by the appended claims.

The present invention is directed to a composition for lining the interior surface of a tundish used in casting steel. The composition may be applied to the interior of the tundish by simple trowelling or by conventional gunning means.

The tundish veneer composition of the present invention includes the following components in the indicated broad ranges:

| Composition Component | Concentration (percentage by weight) |
|---|---|
| MgO | 45-80 |
| refractory clay filler | 1-7 |
| refractory glass wool fiber | 1-15 |
| aqueous colloidal silica binder | 3-10 |

When applied by trowelling, the above compositions will be mixed with from 15-50% by weight of water before application. In gunning operations, from 1-10% by weight of water will be added to the composition at the gun nozzle.

Generally, the above composition will also include up to about 15% by weight of crystalline or amorphous graphite. The presence of the graphite facilitates the removal of the skull of steel remaining in the tundish when it cools down.

In a preferred embodiment of the present invention, at least 0.1% of a foaming agent will be added to the mixture in order to facilitate the entrainment of air bubbles into the composition which contribute to veneer insulating properties.

In yet another preferred embodiment, the composition will also include a dispersing agent in an amount sufficient for dispersing the glass wool fibers within the composition.

Preferred composition according to the teaching of the present invention would include the following ranges of the indicated components:

| Composition Component | Preferred Concentration (percentage by weight) | Most Preferred Concentration (percentage by weight) |
|---|---|---|
| MgO | 70–80 | 75 |
| refractory clay | 2–7 | 4 |
| refractory glass wool fiber | 5–10 | 10 |
| aqueous colloidal silica binder (about 37.5% by weight $SiO_2$) | 5–7 | 6 |
| graphite | 5–10 | 6 |
| foaming agent | 0.1–0.5 | 0.2 |
| dispersing/binder agent | 0.2–0.8 | 0.5 |

The MgO utilized in the present invention is a well-known and widely available refractory grain material. For present purposes, it is preferred that the MgO be at least 85% pure and that it be calcined to densify the grain and to drive off undesirable waters of hydration. It is preferable that calcining be carried out at deadburn temperatures (about 3000° F.). 200 mesh dead-burned MgO has been found to be particularly useful in the present application.

The refractory clay filler utilized in the present composition may be any of a number of hydrated aluminum silicates or mixtures thereof. Preferred forms of clay include ball clays such as kaolin clay. The refractory clay filler must be kiln dried. A particularly useful kiln dried kaolin clay for present purposes is M&D clay which is available from Kentucky Tennessee Clay Company.

The refractory glass wool fibers used in the composition are conventional silica-alumina refractory fibers. One typical useful such fiber is CERAFIBER 312, a silica-alumina glassy fiber available from Johns Manville Corporation. Slag wools which are glassy-type silica fibers with low alumina content may be used in lieu of the CERAFIBER 312 high alumina type materials, although slag wools are less preferred.

The colloidal silica materials utilized as binders in the composition are generally aqueous silica sol materials available commercially from Nalco Chemical Company under the trademarks NALCOAG and NALGUN or from E. I. DuPont de Neumours under their trademark LUDOX. Examples of silica sols which are useful in the invention may be found in U.S. Pat. No. 3,183,813, the disclosure of which is hereby incorporated by reference.

The graphite optionally incorporated in the composition may be in any of the well-known commercially available forms, including both amorphous and crystalline. The principal consideration is that the graphite particle size be small enough to permit it to be suspended in aqueous media. We have found graphite 3216, a flaky large grain material sold by Superior Graphite, to be particularly useful.

The foaming agent may be a cationic, a non-ionic or an anionic surfactant. Useful surfactants in the present application may be chosen on the basis of their effectiveness in promoting air entrapment in the composition. One preferred foaming agent is ARQUAD T-50 which is a trimethyltallow ammonium chloride material available from Armak Chemical Company.

Finally, the dispersing/binding agent incorporated in the preferred composition is calcium lignosulfonate. This material is intended to aid in dispersing the refractory glass wool fiber to produce a more uniform mixture and to contribute to the binding of the overall composition. One particularly useful calcium lignosulfonate composition is sold under the trademark GOULAC by American Can Company. Similar natural or modified materials useful as dispersing/binding agents will be apparent to those skilled in the art.

In addition to the materials described above, other components may be utilized in the composition for various conventional purposes. For example, materials such as acrylamide-acrylic acid copolymers may be used as thickening agents and various biocides may be incorporated in the composition to prevent deterioration of the material during storage. Sodium chloride may be used in pre-mixed trowelling compositions in order to extend shelf life by discouraging early set-up of the aqueous mixture.

EXAMPLES

Example 1

A composition according to the teaching of the present invention suitable for gunning was prepared using the following components:

| | Percentage by Weight |
|---|---|
| MgO (at least 85% pure, 200 mesh) | 75 |
| M&D koalin refractory clay | 2 |
| CERAFIBER 312 refractory glass wool fiber | 10 |
| NALGUN No. 2 (aqueous colloidal silica binder, about 37.5% $SiO_2$) | 6 |
| 3216 graphite | 6 |
| ARQUAD T-50 (trimethyltallow ammonium chloride) | 0.2 |
| GOULAC (calcium lignosulfonate) | 0.5 |

The ARQUAD and NALGUN ingredients were combined in a suitable container and then vigorously stirred with a propeller mixer to produce a foamy mixture. The remaining dry materials were then slowly combined into the constantly agitating foamy liquid to produce a damp refractory composition having a consistency suitable for gunning. This composition exhibited excellent rebound and "stickiness" characteristics in later gunning tests.

Another composition was prepared according to the above procedure in which the component concentrations were altered as follows:

| | Percentage by Weight |
|---|---|
| MgO (at least 85% pure, 200 mesh) | 73.3 |
| M&D koalin refractory clay | 5 |
| CERAFIBER 312 refractory glass wool fiber | 5 |
| NALGUN NO. 2 (aqueous colloidal silica binder, about 37.5% $SiO_2$) | 6 |

-continued

| | Percentage by Weight |
|---|---|
| 3216 graphite | 10 |
| ARQUAD T-50 (trimethyltallow ammonium chloride) | 0.2 |
| GOULAC (calcium lignosulfonate) | 0.5 |

In later gunning tests, the composition was found to be slightly stickier than the earlier mix. It also had somewhat better wear resistance and resulted in easier skull removal.

Example 2

A number of refractory compositions including two compositions falling within the present teaching, were tested in order to determine their relative strength or ability to withstand a crushing load. The overall compositions tested each included:

| Material | Percentage by Weight |
|---|---|
| graphite (3216) | 6 |
| kiln dried koalin clay (M&D clay) | 2 |
| calcium lignosulfonate (GOULAC) | 0.5 |
| silica-alumina glass wool fiber (CERAFIBER 312) | 10 |
| NaCl | 1 |

In this composition, the NaCl was included to preserve shelf life and was not considered an essential ingredient of the composition. The six refractory compositions included, in addition to the above, the additional components listed in Table I, also in percentage by weight.

nated due to the presence of unacceptable moisture levels in the 1500° calcined MgO binder.

Example 3

The test procedure of this example is a dynamic slag test. According to this procedure the refractory compositions to be tested are applied in strips to the interior of an alumina crucible and the resulting crucible lining is then dried by maintaining the crucible at 200° F. overnight. Once drying is complete, about 10-15 pounds of cold steel are placed in the lined crucible which is then heated in an induction furnace to temperatures of the magnitude encountered by tundishes (approximately 2900° F.). Once the steel melts, about 30-50 grams of slag are placed in the crucible and permitted to churn about for 40 minutes, attacking the tundish lining. After the churning period is complete, the molten steel is poured out leaving a skull consisting primarily of slag adhering to the hot face of the crucible veneer. Once it is cool, the crucible is cut up and the lining inspected. Comparisons of the space between the lining cold face and the lining hot face are made to obtain a measure of relative wear resistance of the test compositions.

If the dynamic slag test were utilized to compare the compositions of the present invention to sodium silicate binder compositions, the present compositions would show highly satisfactory performance generally superior to that of the silicate binder compositions. In addition, removal of the skull portions corresponding to the present composition from the veneer surface would be readily accomplished without damage to the veneer layer.

Example 4

This example is concerned with thermal conductiv-

TABLE I

Example 2

| Test Composition | NALGUN No. 2 | $Na_2O_{3.22}SiO_2$ | Binders aluminum phosphate (10% aqueous) | CaO | $NaH_2PO_4$ | MgO | ARQUAD T-50 | Water** | Other Sodium hexametaphosphate# | Density (gm/cm³) | Strength (p.s.i.) |
|---|---|---|---|---|---|---|---|---|---|---|---|
| 1 | 6 | | | | | 73.46 | 0.88 | 300 | 0.16 | 1.44 | 283 |
| 2 | | 9 | | | | 71.24 | 0.22 | 300 | 0.04 | 1.79 | 44 |
| 3 | | | 3.5 | | | 75.96 | 0.88 | 340 | 0.16 | 1.38 | 129 |
| 4 | | | 7.0 | | | 73.24 | 0.22 | 330 | 0.04 | 1.45 | 145.5 |
| 5 | | | | 1.2 | 1.4 | 75.18 | 0.22 | 300 | 2.5 | 1.60 | 321.6 |
| 6 | | | | | | 79.46* | 0.22 | 365 | 0.04 | 1.63 | 768 |

*Composed of: 20% 325 mesh, 1500° F. calcined MgO serving as binder and 59.46% 100 mesh, 3000° F. dead-burned MgO
**ml of $H_2O$/kg of dry material
used to help maintain foam in trowel applications The six test compositions were prepared and placed in molds to form test bricks which were air dried for one day and then dried at 150° F. for 8 hours followed by 250° F. for 16 hours. These test bricks were then weighed and measured to determine their density which is reported in Table I, following which they were subjected to a compression strength test.

In the compression strength test procedure, test bricks are cut into solid cubes or cylinders and then loaded with increasing amounts of compressive force to the limit of their compressive strength. When the compression limit is reached, the blocks crack and fall apart. The results of the compression strength test are reported in Table I.

The results generated in this example showed that Test Composition 1 exhibited the most promising balance of high strength and low density. While Test Compositions 5 and 6 also appeared promising, 5 was eliminated due to technical considerations and 6 was elimiity. Relative measure of thermal conductivity may be made by forming and drying test bricks as in Example 1 and then resting the bricks with one face in contact with a hot furnace surface of known temperature (hot face) and the opposite cold face of the bricks in contact with a temperature measuring device. The actual temperature drop between the brick hot and cold faces is determined according to this procedure and taken to be a measure of the thermal conductivity of the block.

If the above test were carried out on blocks 9 by 4.5 by 2.5 inches with the opposite 9×4.5 inch faces in contact with the hot surface and the temperature measuring device, the following highly desirable equilibrium test results would be expected:

Furnace temperature (hot face): 1720° F.
Test brick 1 (cold face): 610° F.
Test brick 2 (cold face): 640° F.
Test brick 3 (cold face): 670° F.

Example 5

In this example, the composition set out below was tested in a commercial setting by gunning it onto two tundishes, under the indicated conditions:

| TEST COMPOSITION | Percentage by Weight |
|---|---|
| MgO (at least 85% pure, 200 mesh) | 75 |
| M&D koalin refractory clay | 2 |
| CERAFIBER 312 refractory glass wool fiber | 10 |
| NALGUN No. 2 (aqueous colloidal silica binder, about 37.5% $SiO_2$) | 6 |
| 3216 graphite | 6 |
| ARQUAD T-50 (trimethyltallow ammonium chloride) | 0.2 |
| GOULAC (calcium lignosulfonate) | 0.5 |

| TEST CONDITIONS | | |
|---|---|---|
| Tundish No. | 1 | 2 |
| Gunning time | 45 min. | 40 min. |
| Coating consumption | 120 kg | 120 kg |
| Coating thickness | 10mm | 10mm |
| Preheating | 3 hrs. | 3 hrs. |
| Tundish temperature | Approx. 150° C. | Ambient |
| Tundish surface condition | Good | Somewhat rough |
| Charges | 3(250 tons) | 3(250 tons) |
| Casting time | 3 hrs. | 3 hrs. |

It was found that the temperature drops of the steel contained within the tundishes, 10 minutes after the start of pouring from the ladle, were as follows:

| Tundish No. 1 | Tundish No. 2 |
|---|---|
| 55° C. | 88° C. |

These temperature drops were 10–20 degrees less than were experienced with the same tundishes using tundish boards rather than the tundish veneer test composition. In addition, after three charges, very little tundish veneer remained on the tundish surfaces yet the surfaces were not damaged. The worn veneer could therefore be readily replaced by gunning additional material onto the hot tundish surface, drying the new material and then continuing with casting.

The present tundish veneer composition offers a practical, efficient alternative to tundish top board linings. This new refractory veneer has good insulating properties, resists both physical and chemical attack well, and may be formulated to permit ready removal of steel skulls from the cooled tundish surfaces.

We claim:

1. A tundish veneer composition comprising:
   about 45 to 80 percent by weight of MgO;
   about 1 to 7 percent by weight of a refractory clay filler;
   about 1 to 15 percent by weight of a refractory glass wool fiber; and,
   about 3 to 10 percent of aqueous colloidal silica binder.

2. The tundish veneer composition of claim 1 including up to about 15 percent by weight of graphite.

3. The tundish veneer composition to claim 1 including a foaming agent for introducing entrained air bubbles into the composition.

4. The tundish veneer composition of claim 1 including an agent for dispersing said glass wool fibers within the composition.

5. A tundish veneer composition comprising:
   about 70 to 80 percent by weight of dead-burned MgO;
   about 2 to 7 percent by weight of a refractory kiln dried kaolin clay;
   about 5 to 10 percent by weight of silica-alumina glass wool fiber;
   about 5 to 10 percent by weight of a flaky large grain graphite;
   about 0.1 to 0.5 percent by weight of a foaming agent for introducing entrained air bubbles into the composition; and,
   about 5 to 7 percent by weight of an aqueous colloidal silica binder.

6. The tundish veneer composition of claim 5 wherein the foaming agent is trimethyltallow ammonium chloride.

7. The tundish veneer composition of claim 5 including as a dispersing/binding agent about 0.1 to 0.5 percent by weight of calcium lignosulfonate.

8. A tundish veneer composition comprising:
   about 75 percent by weight of dead-burned MgO;
   about 2 percent by weight of a refractory kiln dried kaolin clay;
   about 10 percent by weight of silica-alumina glass wool fiber;
   about 6 percent by weight of graphite;
   about 0.2 percent by weight of trimethyltallow ammonium chloride;
   about 6 percent of an aqueous colloidal silica binder containing about 37.5 percent by weight $SiO_2$; and,
   about 0.5 percent by weight of an agent for dispersing said glass wool fiber.

9. A method of insulating and protecting tundish surfaces comprising:
   combining about 45 to 80 percent by weight of dead-burned MgO, about 1 to 7 percent by weight of a highly refractory kiln dried kaolin clay, about 1 to 15 percent by weight of glass wool fiber, and, about 3 to 10 percent of aqueous colloidal silica binder to make a gunning mix;
   gunning said mixture with the required amount of water onto a tundish interior surface to produce a tundish veneer; and,
   drying said tundish veneer.

* * * * *